(12) United States Patent
Cheng et al.

(10) Patent No.: US 7,941,562 B2
(45) Date of Patent: May 10, 2011

(54) NETWORK DEVICE FOR MONITORING AND MODIFYING NETWORK TRAFFIC BETWEEN AN END USER AND A CONTENT PROVIDER

(75) Inventors: Lebin Cheng, Fremont, CA (US); Anatoly Tikhman, Hillsborough, CA (US)

(73) Assignee: Red Aril, Inc., San Mateo, CA (US)

( * ) Notice: Subject to any disclaimer, the term of this patent is extended or adjusted under 35 U.S.C. 154(b) by 359 days.

(21) Appl. No.: 11/693,719

(22) Filed: Mar. 30, 2007

(65) Prior Publication Data

US 2007/0233857 A1  Oct. 4, 2007

Related U.S. Application Data

(60) Provisional application No. 60/788,218, filed on Mar. 30, 2006, provisional application No. 60/830,860, filed on Jul. 13, 2006, provisional application No. 60/887,083, filed on Jan. 29, 2007.

(51) Int. Cl.
*G06F 15/16* (2006.01)
*G06F 15/173* (2006.01)

(52) U.S. Cl. .................. 709/246; 709/224; 709/231
(58) Field of Classification Search .......... 709/217–219, 709/223–224, 231, 246
See application file for complete search history.

(56) References Cited

U.S. PATENT DOCUMENTS

| | | | |
|---|---|---|---|
| 6,449,657 B2 * | 9/2002 | Stanback et al. | 709/245 |
| 7,089,194 B1 * | 8/2006 | Berstis et al. | 705/14 |
| 7,406,516 B2 * | 7/2008 | Davis et al. | 709/224 |
| 7,505,928 B2 * | 3/2009 | Lebaschi | 705/26 |
| 2002/0009079 A1 | 1/2002 | Jungck | |
| 2002/0029267 A1 | 3/2002 | Sankuratripati | |
| 2002/0120564 A1 | 8/2002 | Strietzel | |
| 2003/0135582 A1 | 7/2003 | Allen | |
| 2006/0136372 A1 * | 6/2006 | Schunemann | 707/2 |

FOREIGN PATENT DOCUMENTS

| | | |
|---|---|---|
| EP | 1 061 693 | 12/2000 |
| WO | WO 2006/081680 | 8/2006 |

OTHER PUBLICATIONS

PCT International Search report dated Oct. 18, 2007 on PCT/US2007/008015.
PCT Written Opinion of the International Searching Authority on PCT/US2007/008015, Dated Oct. 18, 2007.

* cited by examiner

*Primary Examiner* — Hussein A Elchanti
(74) *Attorney, Agent, or Firm* — K&L Gates LLP

(57) ABSTRACT

A network device for monitoring and modifying data traffic between a client device and a server device is disclosed. The network device is configured to provide targeted advertisements to a user based on some or all of the data traffics generated the user. Different from a proxy server, the network device operates transparently from both perspectives of a computer being used by the user and a website being visited by the user. The network device is disposed in line between the computer and the network so that all data traffics are examined. The data packets exchanged between a computer and a website being visited are altered or modified in such a way that the head of the packets remains largely intact while the payloads of the packets are changed to suit the need of delivering transparently the targeted commercial information.

20 Claims, 4 Drawing Sheets

NETWORK DEVICE FOR MONITORING AND MODIFYING NETWORK TRAFFIC BETWEEN AN END USER AND A CONTENT PROVIDER

CROSS-REFERENCE TO RELATED APPLICATIONS

This application claims the benefit of priority from U.S. provisional patent application No. 60/788,218, filed, Mar. 30, 2006, entitled "A method for enabling content- and context-sensitive activity on a packet-based network when the provider of the content- and context-sensitive activity is not the provider or intended recipient of the content or context", U.S. provisional patent application No. 60/830,860, filed Jul. 13, 2006, entitled "Content-, context- and behavioral-based advertising on a packet-based network", and U.S. provisional patent application No. 60/887,083, filed Jan. 29, 2007, entitled "Content-, context- and behavioral-based advertising on a packet-based network", which are hereby incorporated by reference for all purposes.

BACKGROUND

The Internet has provided new avenues for delivering advertising to consumers. One early form of Internet advertising is the "banner ad," which entails embedding an advertisement into a web page. The banner ad is intended to attract traffic to a website of the advertiser. The advertisement is typically constructed from a high-aspect ratio image, often employing animation or sound to maximize presence. These advertisements can be positioned somewhere near the primary content for that web page (e.g., from a newspaper article or a collection of web portal links). The typical banner ad is purchased in bulk by the advertiser from a publisher of the web page. Often, the content of the advertising bears no relationship to the interests of the viewer, and therefore makes it unlikely that the viewer will attempt to click through to the website of the advertiser. In many cases, publishers over the Internet do not interact directly with advertisers, but instead rely on intermediaries to secure the advertisers.

Some website operators will tailor the advertisements served to users based on respective activity of the users. For example, when a user enters a search query on a search engine website, the website may deliver advertisements based on the search terms in addition to delivering the requested content. In this case, the content provider (i.e., the search engine website) is the intended recipient of the search query from the user, so the content provider is able to provide targeted advertising based on the search query or the results from the relevant search websites. Thus, the content provider possesses the information necessary to make determinations regarding the content and context from the user.

In broadcast television, advertisers utilize context-targeted advertising in which the commercials shown during breaks in the television programming are related to the content of the television programming or the target demographic of the television programming.

The entities that own computer networks, their agents, and have access to the information flow on such networks are hereafter referred to as "Service Providers" (SP). In various ways, these service providers facilitate movement of packetized information in a computer network. Such service providers typically provide value-added services, such as providing "last-mile" hook-up of the network to the home, office, or mobile product, using networks the service providers own or networks owned by other service providers.

Service providers may examine information from content being communicated over the service providers' networks. For example, service providers today examine data packets to inspect for computer viruses, thereby enhancing the security of the network. In some cases, a service provider may even be able to obtain the first-hand knowledge how a subscriber browses the Internet for relevant information. However, the service provider is not being fully equipped to provide commercial information that may be of high interest to its subscribers.

It would therefore be desirable for a service provider to be able to deliver targeted advertising content based on information communicated over the network of a service provider.

SUMMARY

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

Broadly speaking, the present invention pertains to a network device configured to provide targeted advertisements to a user based on some or all of data traffics generated by the user. According to one aspect of the present invention, different from a proxy server, the network device operates transparently from both perspectives of the computer being used by the user and a website being visited by the user. According to one embodiment, the network device is disposed in line between the computer and the network so that all data traffics are examined. The data packets exchanged between a computer and a website being visited are altered or modified in such a way that the head of the packets remains largely intact while the payloads of the packets are changed to suit the need of diverring targeted commercial information, if necessary.

According to another aspect of the present invention, the network device is configured to analyze content, context or behavioral activities of a user. Based on the analysis, commercial information most likely to interest the user is assembled and delivered to the user in different ways, depending on implementation, applications and/or displays of data from a website. According to still another aspect of the present invention, the commercial information provided by or via the network device may be placed near a primary location in a display of the data from a website and replace an original advertisement with a targeted advertisement in the display.

In accordance with embodiments of the present invention, one or more of the following may also be provided. First, a network device which can determine the content of web pages being downloaded and can apply rules so as to decide whether to add advertising content or replace advertising content that already exists on that web page. Second, a network device may be used to eliminate or replace links to advertising while the packets are being downloaded to the user. Third, when the original link is eliminated rather than replaced, the network device may be used to insert advertising content in place of the original link.

The present invention may be implemented as a method, a process, a device or a part of a system. According to one embodiment, the present invention is a network device for monitoring data traffic between a client device and a server device, the network device comprising: an activity monitor to intercept data packets being exchanged between the client device and the server device, the activity monitor configured to cause the data packets to bypass the network device when there is a need; a dispatcher, coupled to the activity monitor, receiving the data packets and determining whether any of the data packets provide a suitable advertising opportunity, wherein the intercepted data packets are unmodified and delivered to a destination identified therein, if there is no such an opportunity, and an analysis processor receiving the intercepted data packets and modifying the intercepted data packets to include targeted commercial information without altering head portions of the data packets, when the dispatcher identifies that there is an opportunity to include the commercial information in some or all of the intercepted data packets.

According to another embodiment, the present invention is a method for monitoring data traffic between a client device and a server device, the method comprising: intercepting a flow of data packets, each having a destination address; detecting whether the data packets satisfying predetermined selection criteria; modifying payloads of the data packets to include targeted commercial information; and forwarding the flow of the modified data packets to the destination address.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DESCRIPTION OF THE DRAWINGS

These and other features, aspects, and advantages of the present invention will become better understood with regard to the following description, appended claims, and accompanying drawings where:

DETAILED DESCRIPTION

Figure 1:
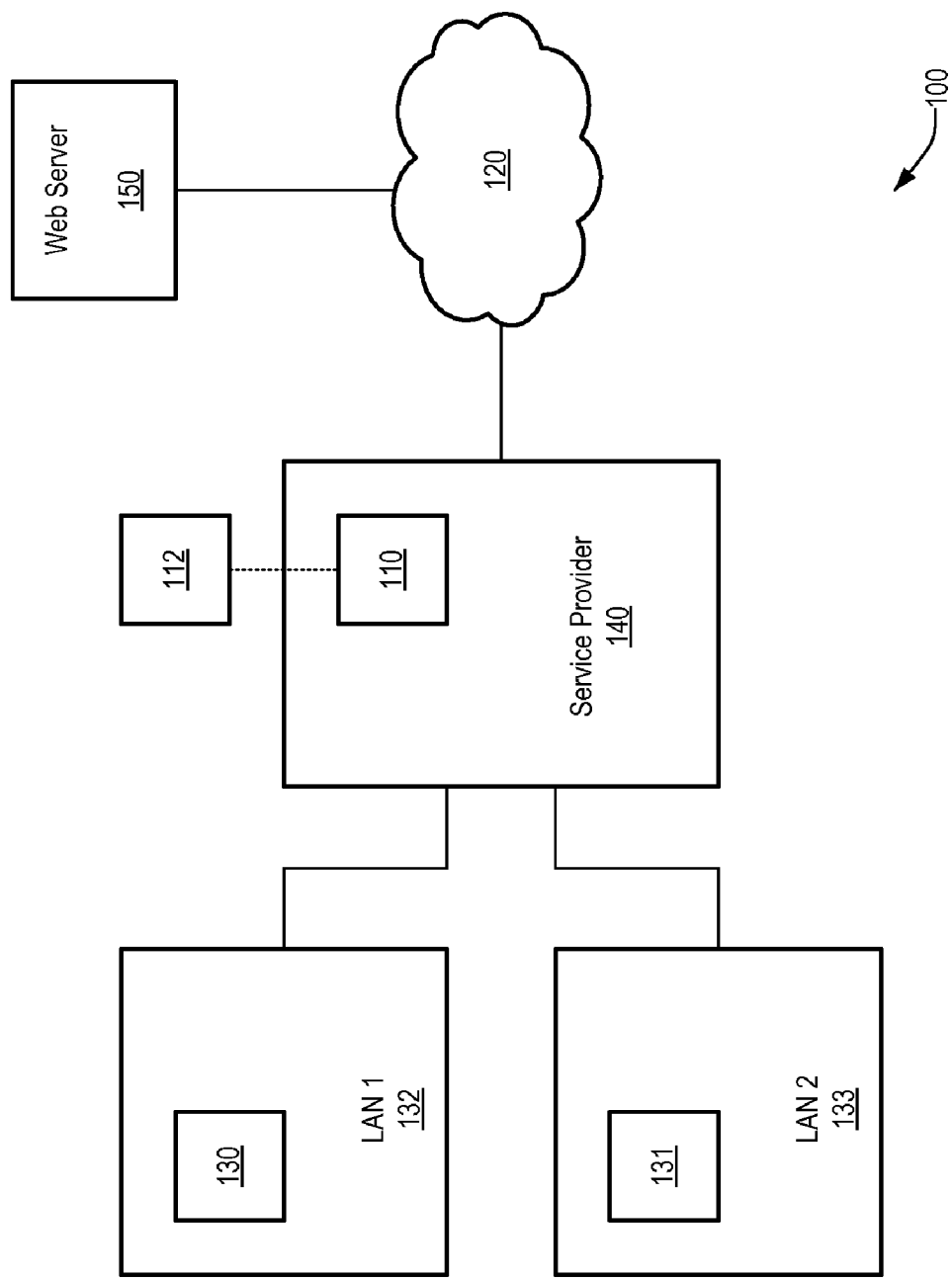
FIG. 1 shows a simplified block diagram of an environment in which an advertising analysis and insertion network device may be implemented.

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

There are three primary types of online advertisements: impression based, pay per click, and pay per action. Impression-based advertisements are passively presented to a user and are intended to raise the awareness of the product or service being advertised among all users. Typically, no user action is required in order to determine the compensation to the entity distributing the advertisement; the advertiser pays for each presentation or impression of the advertisement. Pay-per-click advertisements enable users to click and activate a Uniform Resource Locator (URL) link to navigate to another website related to the advertisement. The entity distributing the pay-per-click advertisement is paid for each instance of a user activating the URL link. Similarly, pay-per-action advertisements require not only a user click but further user actions, such as the completion of an on-line form, before the advertiser pays for that advertisement. In all three cases, the effectiveness and cost of an advertisement can depend on its relevancy to a user's interest and the ability for the entity to target users with specific interests.

In accordance with one aspect of the present invention, systems and methods are provided for enabling a service provider to monitor or profile user activity in order to provide more relevant advertising to the users based on the monitored user activity. Service providers can extract contextual information from the content and provide context advertising in the same way as intermediary companies. In addition, due to the fact that service providers are exposed to all content a user consumes, service providers can derive user behavioral information from the collection of user content and use such unique information to serve even more relevant advertisement compared to intermediary companies.

Advertisements may be provided in various ways. In some embodiments, the service provider will provide advertising content to the user. The SP may supplement advertising content already existing in the content provided by the publisher with additional supplemental advertising content. In other embodiments, the SP may replace existing advertising with replacement advertising content. This replacement advertising content may be generated or served by the service provider or organizations having access to the service provider network traffic in a manner that may co-exist with existing advertising placement systems and which has a high relevancy to the user based on content, context or behavior thereof. The supplemental or replacement advertising content may be inserted with permission of the original web site publisher to replace low relevancy advertising content with advertising content of higher relevancy to the user.

Referring now to the drawings, in which like numerals refer to like parts throughout the several views. FIG. 1 is a simplified block diagram of an environment 100 in which a network device 110 may be implemented. In this environment 100, a first user at a first computing device, e.g., personal computer (PC) 130, may be coupled to the Internet 120 via a service provider (SP) 140. The PC 130 may be provided in a Local Area Network (LAN) 132, which is coupled to the SP 140 via any of a variety of known wired or wireless technologies, e.g., a DSL or cable modem. Similarly, a second user at a second computing device, e.g., personal computer (PC) 131 in a second LAN 133, may also be coupled to the Internet 120 via the SP 140. The first PC 130 may then be coupled to a web server 150 to retrieve content of interest to the first user.

In accordance with one embodiment, the network device 110 is deployed by the SP 140 to analyze the network traffic flowing through the SP 140 to and from various end user devices (e.g., PCs 130, 131). The network device 110 may be deployed in an inline fashion and placed at a location in a network where there is a high probability that data packets carrying content both generated by and consumed by the end-user can be conveniently examined. For example, the network device 110 may be implemented in a router or a switch. In one embodiment, the network device 110 may be a stand alone device that is to be disposed in a line to intercept data packets. Because such a network device in one embodiment, as will be further explained below, is configured not to alter the header portion of each data packet and only modify the payloads of some of the data packets, their presence in the network is transparent to either sides (e.g., the user and the publisher)

The network device 110 comprises various functional units capable of the inspection, analysis, and modification of network flow. In accordance with various embodiments, the network device 110 can handle one or more types of Internet Protocol (IP) based application protocols, including but not limited to, for example, HTTP, WAP, and RTP. The inspection, analysis, and modification of network flow may be used for the purposes of facilitating advertising to the end users. Because the network device 110 is implemented at a location through which multiple computing devices (e.g., PCs 130-131) pass data, each network device 110 may service multiple end users.

As described above, the network device 110 may analyze traffic going to and from the end users at PCs 130-131. Based on that analysis, the network device 110 determines the content of the information flowing to and from the end users. The network device 110, using software that may be resident on the device 110 itself and optionally in conjunction with software that may be resident on other devices (e.g., analysis server 112, coupled to the network device 110 either locally or via the Internet 120), then uses the information to generate and present advertising to the end-user that is relevant to the end user.

In some embodiments, the network device 110 may contain, or may be linked to databases that may, for a period, maintain information about the context and behavioral aspects of the actions of each user. The network device 110 is configured to determine appropriate actions to take by relating that information gathered to a rule engine that may be locally or remotely located. Based on instructions from the rule engine, the network device 110 is configured to determine what types of advertisements to be delivered to a user(s).

The network device 110 may insert advertising so that it is displayed directly on the device 130. Alternatively, the network device 110 may insert links to advertising in the content displayed on the device 130 so that the advertising is displayed if the user chooses to follow the link. The network device 110 may eliminate or substitute existing links in a web page as the web page is being downloaded from the web server 150 to the device 130.

In one embodiment, the network device 110 is configured to replace existing advertising that is supposed to be displayed when accessed, in a manner that does not require the publisher to make any changes to the original content being served. For example, if the user attempts to retrieve a web page, advertisements on that web page that are provided by the web server 150 may be replaced by the network device 110 without the need for any modification to the web page served by the web server 150. This may substantially enhance the service provider's ability to introduce advertising that competes with "advertising service applications" such as an advertisement network. A publisher is often reluctant to modify its original web site content in collaboration with a service provider because most web content will be frequently accessed by other users outside of a service provider's network. Thus, the network device 110 can enable an SP 140 to customize user content uniquely for its end users (e.g., PCs 130-131) without modifying the content delivered to other users who access the web site through other service providers. The network device 110 may extract and discard packets, reroute packets (for example to the buffer), and may intercept responses (e.g., click-through or other user interaction) to advertising that the network device 110 has inserted.

Figure 2:
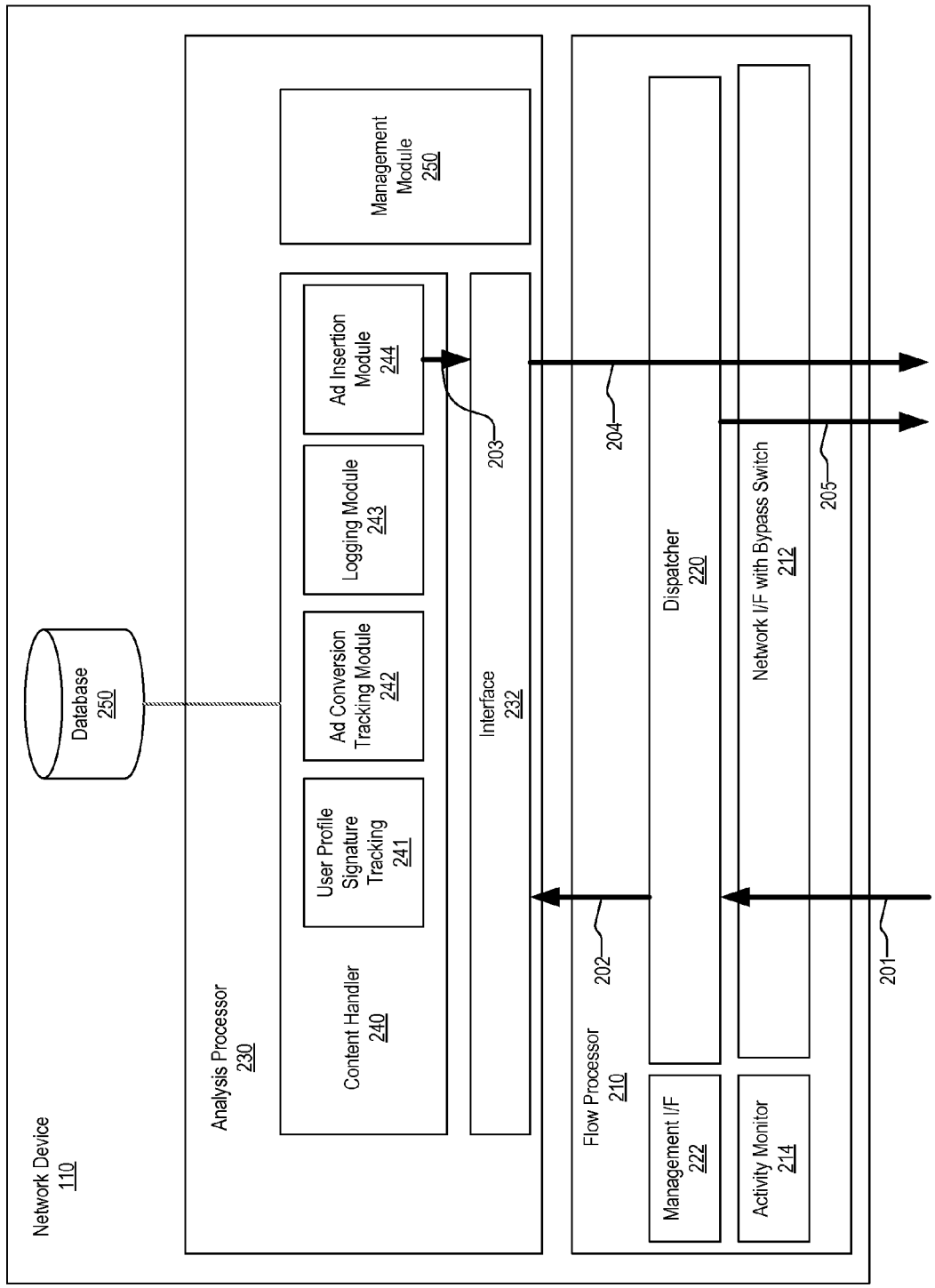
FIG. 2 is a simplified block diagram of an exemplary advertising analysis and insertion network device.

FIG. 2 is an exemplary block diagram of the network device 110. In this embodiment, the network device 110 comprises a flow processor 210, an analysis processor 240, and a database 250. The flow processor 210 comprises a network interface 212, an activity monitor 214, a dispatcher 220, and a management interface 222. The analysis processor 240 comprises an interface 232, a content handler 240, and a management module 250.

In operation, data packets passed between a user device (e.g., PC 130) and a publisher (e.g., web server 150) that would normally pass through the service provider 140 are routed to or intercepted by the network interface 212, as shown by an arrow 201. These packets are processed by the network device 110 as described in greater detail below, and are forwarded to the target destination either unmodified or modified, as indicated by the arrows 204 or 205. The data packets may originate from the user device with the publisher as the destination, or may originate from the publisher with the user device as the destination.

According to the International Organization for Standardization, the Open Systems Interconnect (OSI) reference model for data communication, also known as a seven layer model, defines the framework for network communication as follows:

| Layer 7 | Application |
| Layer 6 | Presentation |
| Layer 5 | Session |
| Layer 4 | Transport |
| Layer 3 | Network |
| Layer 2 | Data Link |
| Layer 1 | Physical |

In accordance with various embodiments, the network device 110 is configured to operate on one or more of these layers.

In one embodiment, the flow processor 210 includes an activity monitor 214, which monitors the operational state of the network device 110. The network interface 212 is configured such that in the event of a failure of the network device 110, a bypass switch in the network interface 212 will automatically close (i.e., to allow the data to bypass the network device 110). The bypass switch, when functioning, causes the data packets to be routed directly to the target destination. This provides a fail-safe operation so that even in the event of failure of the network device 110, the network traffic through the service provider's network will not be impacted.

This fail-safe operation may be implemented in a variety of ways. For example, the analysis processor 230 is configured to transmit a periodic heartbeat signal to the activity monitor 214. If the activity monitor 214 fails to detect the heartbeat signal within a predetermined time frame, the bypass switch will be immediately closed. In some embodiments, the bypass switch may be activated remotely. This can enable an administrator to cause the network traffic to bypass the network device 110 so that upgrades, rebooting, or other maintenance may be performed on the network device 110.

In some cases, the network device 110 may operate similar to a passive network tap, which merely analyzes a copy of the data passing through the device without modifying the data. In other cases, the network device 110 does not merely operate on a copy of the data, as in a network tap. Instead, the network device 110 receives the data packets and modifies the packets before forwarding the packets to the target destination.

The interface 212 may comprise a TCP/IP network stack which is modified to facilitate the functions contemplated in the network device 110, as described herein. In particular, the TCP/IP network stack may be configured to receive packets without terminating the data flow. In other words, when the packets are forwarded by the network device 110 to the target destination, the source IP address is not modified. Similarly, in order for the packets to be received and analyzed by the network device 110, the destination address does not need to correspond with the network device 110.

Accordingly, the network device 110 may differ from a conventional transparent HTTP proxy in that the network device 110 does not take on an IP address of its own. A conventional HTTP proxy terminates client connections to the server at the proxy device and initiates new connections to the web server. In doing so, the original client source IP address is no longer visible to the web server. In contrast, packets either processed or inserted by the network device 110 are identified by the same source and destination IP addresses and transport layer protocol port numbers as the original client and server generated packets.

The flow processor 210 further comprises a dispatcher 220, which analyzes the data packets re-routed by the network interface 212. The dispatcher 220 is configured to examine each data packet to identify certain predetermined types of data packets that are of interest. For example, in some embodiments, the operator of the network device 110 may only be interested in analyzing packets containing data according to the Hypertext Transfer Protocol (HTTP). When the dispatcher 220 examines the header of each packet, the dispatcher 220 can quickly identify packets containing HTTP payloads. All HTTP traffic will then be forwarded from the dispatcher 220 to the interface 232 of the analysis processor 230 for further analysis, as indicated by the arrow 202. Other traffic not of interest (e.g., non-HTTP traffic, such as Internet Message Access Protocol (IMAP) traffic) is forwarded onto the target destination without further analysis, as indicated by arrow the 205. In some embodiments, the dispatcher 220 is configured to examine the destination port number in packets to identify whether the packets shall be forwarded to the analysis processor 230 for analysis. For example, all packets directed to port 80 (typically used for HTTP traffic) will be forwarded to the analysis processor 230 for further analysis so that appropriate modifications may be taken to the packets for delivering targeted advertisements.

In some embodiments, more than one protocol will be of interest and forwarded by the dispatcher 220 to the analysis processor 230. For example, Session Initiation Protocol (SIP) or AOL Instant Messenger Protocol (AIM) traffic may also be of interest and will be forwarded. Accordingly, in various embodiments, one or more application layer protocols may be identified as being of interest for further analysis, and will be forwarded by the dispatcher 220. In other embodiments, the dispatcher 220 will examine the characteristics of the data packets on other network layers in order to identify the packets of interest.

In other embodiments, the dispatcher 220 is configured to identify the packets of interest in other ways. For example, the dispatcher 220 may identify particular source and/or destination IP addresses as being of interest or not of interest. This may be useful when it is desired to either target or to exclude certain groups of users for analysis and/or advertising content insertion. In some cases, a particular user device or a collection of user devices may be identified as being exempt from advertisement insertion (e.g., if a user or group pays an extra fee for advertising-free service).

In some embodiments, the dispatcher 220 may identify a particular flow by examining the source IP address, the destination IP address, the protocol number, the source port number, and the destination port number in a data packet. One or more of these fields may be used to identify the flow and/or session by the user. Thus, the dispatcher 220 can identify all of the packets relating to a particular flow and forward those packets to the analysis processor 230.

In some embodiments, the dispatcher 220 may comprise a ternary content addressable memory (TCAM) device to determine which packets to bypass and which packets to assemble to layers 6 through 7.

The analysis processor 230 includes a content handler 240 which is configured to process the packets received by the interface 232 from the dispatcher 220. The content handler 240 may include one or more modules for processing the packets in different ways. In the example shown in FIG. 2, the content handler 240 includes a user profile signature tracking module 241, an ad conversion module 242, a logging module 243, and an ad insertion module 244. In one embodiment, the user profile signature tracking module 241 is provided to keep a profile of the user. Depending on implementation, the profile may be established locally or remotely for a user, per an IP address or a session. For example, a user spends a substantial amount of time browsing websites related to golf, the user is thus profiled as having interests in anything related to golf, some interest in outdoor activities. In one embodiment, a user is profiled using non-personally identifiable information (non-PII). Depending on implementation, the user may be profiled using a signed IP address, an MAC address, a login name in the service provider network 150, or other information.

Should a client machine be often used to download movies, the client machine may be profiled per an IP address (static or dynamic) such that advertisements related to movies may be targeted to the client machine regardless the viewer at the time of delivering the advertisement is a subscriber or someone not related to the SP. Likewise, a user may open multiple windows, each having established a session with a website. All the websites being accessed by the user may have little in common. Thus each session may be profiled, and only an advertisement related to the content or context of a website in a session may be delivered.

The ad conversion tracking module 242 is configured to identify successful advertising conversions in which a user responds in some way to an advertisement delivered to that user.

The logging module 243 is configured to log a history of activities performed by a user. For example, the logging module 243 may maintain a history of all of the web browsing done by the user. It may be desirable to store a summarized history of the browsing, so as to reduce the amount of information stored about the user. For example, a user visits to certain categories of websites may be stored (e.g., a number of visits to basketball-related web sites). This log may be used by the user profile module 241 to generate a profile of the user based on the detected activities.

The ad insertion module 244 is configured to insert advertising into a data flow (either as a supplement to the existing content or to replace existing content). The ad insertion module 244 may refer to predefined rules regarding what action to take based on the observed behavior of the user. These rules will define the advertising content to be provided to the user and the method of inserting that advertising content. These rules may relate to the content of the information being provided to the user, the context in which that information is being provided, and behavioral rules. Given the description of the user profile signature tracking module 241, the ad conversion module 242, the logging module 243, and an ad insertion module 244, those skilled in the art may appreciate that additional modules may be designed and added in. For example, a module configured to receive updated commercial information from another device over the Internet.

The analysis processor 230 may be implemented in a variety of ways. For example, the analysis processor 230 may be implemented using one or more computers in a distributed fashion. Different types of memory devices may be used, including, but not limited to, randomly addressable memory, static, dynamic, flash, hard drive, and EEPROM. The analysis processor 230 may comprise regular expression comparison software code or a regular expression accelerator. In one embodiment, the content handler 240 is implemented in a module that is executed in a processor enclosed in a network device and configured to perform the functions of the user profile signature tracking module 241, the ad conversion module 242, the logging module 243, and an ad insertion module 244.

Depending on the type of modules implemented in the content handler 240, the analysis processor 230 may buffer information, distribute the information, maintain information on the users, maintain information on the advertisements to be inserted, maintain the advertisements, determine the appropriateness of the advertisement to insert and under what circumstances, collect and channel certain information on the users for further analysis, and insert the advertisements when appropriate. The analysis processor 230 may communicate with the activity monitor 214, with management systems elsewhere in the network via a management module 250, and with the TCP/IP stack in the interface 232.

In some embodiments, the network device 110 further includes a module that converts data corresponding to OSI layer 2, 3, or 4, and assembles the data at OSI layers 6 or 7 in order for the analysis processor 230 to analyze the content, context, or behavioral activities of the user at the application layer. This is accomplished without requiring any change of network addresses on the user's computer or other network devices.

Figure 3B:
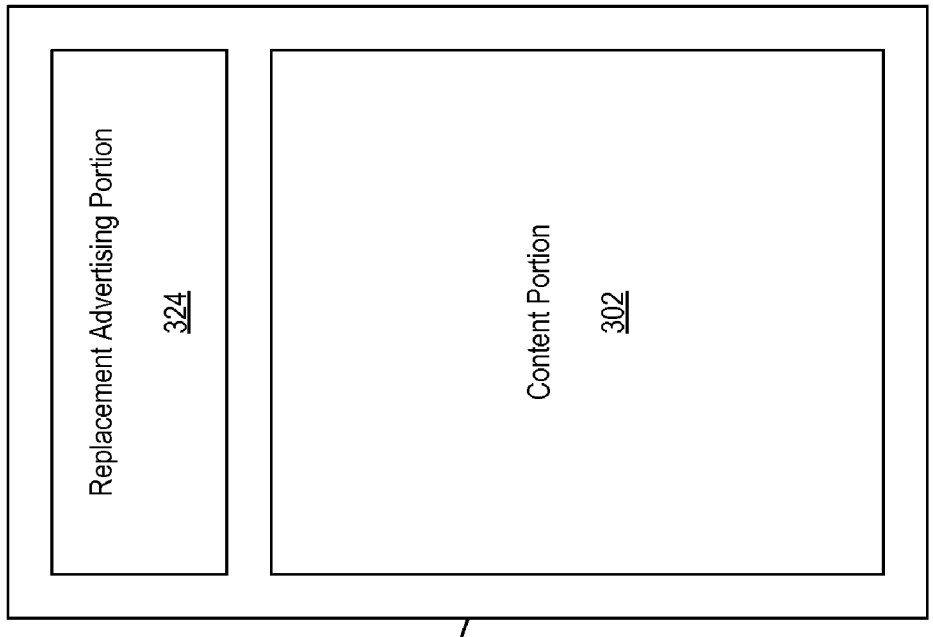
FIGS. 3A-3B illustrate a method of replacing advertising content in accordance with embodiments of the present invention.
Figure 3A:
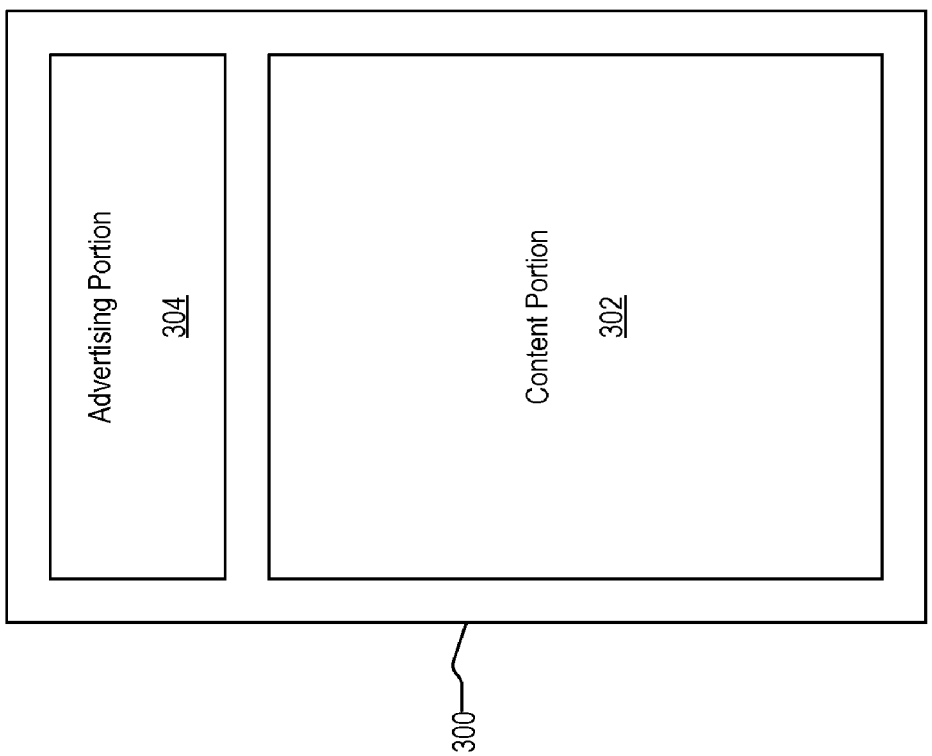

FIGS. 3A-3B illustrate a method of replacing advertising content in accordance with one embodiment of the present invention. FIG. 3A shows a webpage 300 which may be provided to an end user by a publisher. The webpage 300 includes a content portion 302 and an advertising portion 304. The advertising portion 304 may be in the form of an HTML IFrame (inline frame) element. Alternatively, the advertising portion 304 may comprise some other type of HTML elements.

When the web page 300 is requested to be delivered to the user device 130 via the service provider 140, the network device 110 detects the presence of the advertising portion 304. If this web page 300 is determined by the content handler 240 to be suitable for advertising content replacement, the ad insertion module 244 is configured to replace the advertising portion 304 with a replacement advertisement portion 324 and deliver a revised web page 320 to the user device 130. This revised web page 320 would include the same content portion 302 as the original web page 300, but with different advertising content in the advertising portion 324. However, this replacement will be seamless to the user.

This replacement advertising content may be implemented in a variety of situations. For example, the network device 110 may be configured to replace advertisements in web sites where the web page publisher has already allowed advertising to be inserted by another entity. One example of such existing advertising is an advertising network. With an advertising network, a web site publisher can provide space on the publisher's web site with a link to advertising content provided by the advertising network. Typically, the advertising network will share advertiser revenue with the web site publisher for qualified conversions each time a visitor to the web site clicks on ads.

The service provider 140 may elect to insert advertising content in the same space allocated to the advertising content provided by the advertising network. In some cases, the service provider 140 may compensate the publisher for the insertion of this advertisement. This advertising content replacement may be accomplished by the network device 110 as follows.

In operation, the interface 212 intercepts the packets containing the website data. The dispatcher 220 identifies those packets as an HTTP flow. These packets are then forwarded to the analysis processor 230 where the ad insertion module 244 determines the existence of the advertising replacement opportunity by noting the existence of the link to a known advertising services entity such as an advertisement network. In addition, the ad insertion module 244 may analyze the packets to identify the originating website as a web site which has agreed to such an advertisement replacement.

Next, the ad insertion module 244 withholds the original advertisement content to prevent double accounting of the advertisement being served. In some cases, the original advertisement content is deleted. In some cases, the logging module 243 may log the deletion of the advertisement to enable a determination of compensation to the original advertising services entity for the withholding of the original advertising content being replaced.

Finally, the replacement advertising content is inserted in the same location in the webpage as the advertising content which was being replaced. One of the key features in the present invention is to select the inserted advertising content based on specific information about the user, so as to maximize relevancy to the end user and improve the likelihood of successful conversion.

If the user interacts with the inserted advertising content, these responses (e.g., click-through or other user interaction) may be intercepted by the network device 110 and not forwarded to the web server. Thus, the network device 110 may then provide the appropriate response to the user's request without requiring any intervention by the web server.

In terms of processing or modifying the data packets that carry the original advertisement to be replaced, the network device 110 is configured to modify only the payloads of the data packets. When the data packets are detected, the header portions are retained intact while the payload portions are modified to replace the data representing the original advertisement with corresponding data representing the replacement advertising content. As a result, the operation of modifying the data packets is transparent, so is the network device, to the user device as well as to the original website of the content.

Figure 4:
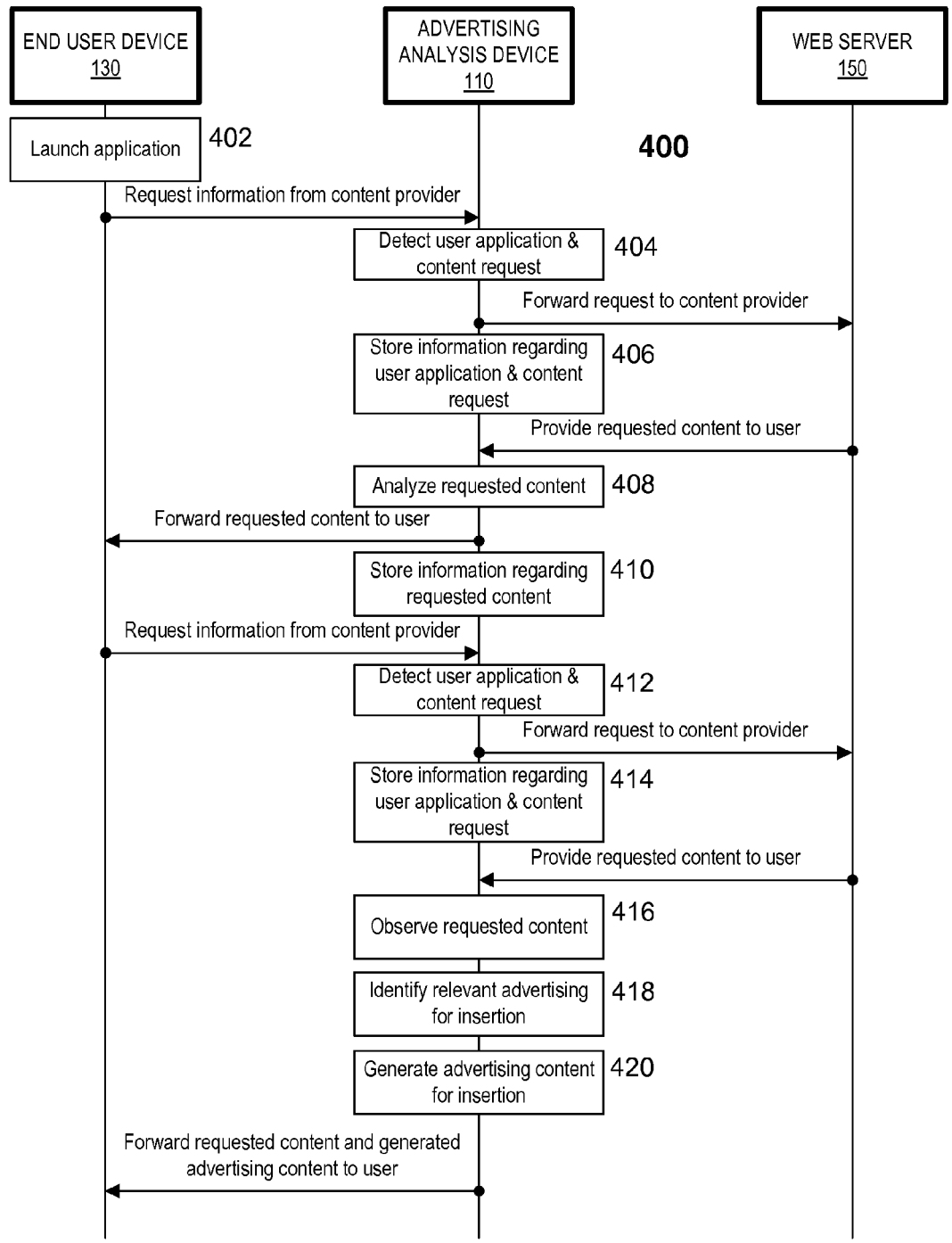
FIG. 4 is an illustrative process flow between an end user device, an advertising analysis and insertion network device, and a content provider, in accordance with embodiments of the present invention.

FIG. 4 is an illustrative process flow 400 between a client device (e.g., an end user 130), a network device (e.g., the network device 110), and a content provider (e.g., the web server 150), in accordance with one embodiment of the present invention. The process flow 400 may be implemented as a method, a process, a device or a part of a system.

In operation, a user launches an application at 402, such as a web browser or an instant messaging application, on the client device. The user then utilizes the application to request information from the content provider. This may be, for example, an HTTP request to retrieve a particular webpage from a website of the content provider. As this request passes through the service provider 140, the packets containing this request are intercepted and routed to the analysis device 110. The user profile signature tracking module 241 may be used to detect the application and the content request at 404. The information about the user may be stored in a database (e.g., the database 250) for later analysis at 406. As more information about the user is acquired over time, the analysis processor 230 may be able to refine the user profile to more effectively identify relevant advertising content for that user. It is assumed that the analysis processor 230 does not identify a suitable advertising opportunity, so the network device 110 forwards the request unmodified to the content provider.

In responding to the request, the web server 150 provides the requested content to the user device 130. This requested content is again intercepted by the network device 110 as it passes through the service provider network 140 and the requested content provided by the web server 150 is analyzed by the analysis processor 230 at 408. It is assumed that the analysis process 230 does not identify a suitable advertising opportunity, so the network device 110 forwards the content unmodified to the end user device 130. At 410, Information regarding the requested content may be stored in the database 250 to provide additional information regarding the user at the end user device 150. For example, if the content provided by the web server 150 relates to sports scores, this may indicate that the user is a sports fan who is potentially a good candidate to receive sports-related advertising content.

Next, the user requests further information from the content provider. This request may take various forms. For example, the user may click on a link in the webpage previously provided by the web server 150. Alternatively, the user may enter text into a text field in the webpage. This request is also detected at 412 and stored in the network device 110 at 414 and forwarded on to the web server 150 unmodified.

In response to this request, the web server 150 provides the requested content to the user. The network device 110 analyzes this requested content at 416. In this case, the ad insertion module 244 identifies an opportunity for inserting relevant advertising at 418. The advertising content is generated at 420 based on the content or context of the content in the received data from the web server 150 and inserted into the data flow such that the requested content and the generated advertising content are forwarded to the user.

The advertising content may be generated in a variety of ways. For example, a library of advertising content may be previously stored and retrieved by the ad insertion module 244 as needed. Alternatively, the ad insertion module 244 may retrieve the advertising content from another entity based on specified criteria. For example, the analysis processor 230 may have determined that the user is a basketball fan. In this case, the ad insertion module 244 may request from a third party advertising provider advertising content relevant to basketball fans, such as basketball shoes or athletic event promotions.

In one embodiment, the network device 110 can further enhance the value of the service provider advertisement service by dynamically correlating user behaviors in different applications communicated via a variety of application specific protocols. One benefit of such correlation is the more accurate measurement of the conversion rate of a user being shown an advertisement. This conversion rate is a critical indicator of the effectiveness of an advertising campaign and thus a critical factor deciding the rate a service provider can charge for the advertisement.

In one example, a user may use a browser application to view an advertisement on a website about a particular model of new basketball shoe. Then, instead of clicking the advertisement link on that web site, the user may start to chat with friends about the basketball shoe using an instant messenger application. Existing methods of tracking click-through user behavior would fail to capture such a successful conversion. In contrast, because all network traffic flows through the network device 110, the network device 110 is capable of analyzing user behavior using multiple applications.

In this example, the network device 110 would first detect that the shoe advertisement was being served to the user via a browser application. Next, the network device 110 would detect that the content of the user's instant messages included a mention of that shoe. Accordingly, the network device 110 is capable of tracking multiple protocols and correlating the information received from those protocols to enhance the accuracy of advertisement targeting and tracking.

In some embodiments, the network device 110 may also recognize that a file or a streaming video downloaded by an end user is a movie. In response, the network device 110 may insert into the file or the stream an advertisement that is to be shown when the movie is played. In addition, the network device 110 may recognize that the movie is being downloaded and shown concurrently. In that event, the network device 110 may detect that a buffer of suitable length is available to the end user, so that it may interrupt and buffer the stream of traffic long enough to allow it to alter the content flow seamlessly. Variations of the network device 110 may also have memory buffers where movies, or portions of movies, or other content being flowed to the user may be stored. The network device 110 uses the interrupted time to insert advertising into the streaming flows (e.g., in an IPTV service).

Embodiments of this invention may provide various advantages, such as the fact that a publisher does not need to make any changes to a website in order to provide more relevant advertising content to the user. In addition, the website, with the original advertising links or content, can remain intact for other users who may access the website via a network not provided by a particular service provider. This enables the service provider to serve advertising that appears to be on web pages otherwise serviced with advertising by other advertising services entities.

It deems necessary to describe the differences between a proxy server and the network device contemplated in the present invention. A conventional proxy server differs from the network device described above in several respects.

First, a proxy server terminates client connections before opening new connections to fetch information from servers. From the perspective of a content publisher, requests for contents come from the proxy server, not the client. The presence of the proxy server effectively masks the identity of end user clients. Some applications, such as application having high security protection, may not operate properly with such proxy servers.

Second, proxy servers cannot be made completely transparent. Proxy servers have their own IP addresses as well as MAC addresses. Either the end user must configure their browser to point to a proxy server or a network device such as a router or an application level switch must redirect network traffic to the proxy server. If the proxy server ever goes out of service, specific mechanisms must be implemented by the operator of the network to reroute network traffic. Third, proxy servers are application protocol specific. Support for each specific protocol must be implemented in the proxy server. In addition, not all applications can be made to interoperate with a proxy server in the middle. Certain applications, such as security applications and/or real-time applications, stop working either because the end points must know the network identities of each other or the proxy server simply introduces too much delay. Accordingly, the network device in the present invention provides improved handling of IP-based network packets with an increased level of transparency.

Various methods have been proposed which describe the serving of relevant advertisements based on the key interest area of a web page. Such methods can be employed in various embodiments of the present invention. However, these embodiments are not limited to such specific algorithms. In fact, with the data and the advertisement insertion capability of the network device, any type of algorithm can be applied to serve targeted advertisements to end users.

Other methods have been described for providing customized web content based on user input and to cache such content to improve performance if the inputs do not change. Various embodiments of the network device can modify the web page being served, but with the additional capabilities of tracking user sessions and serving advertisements with minimum impact on both the end user and publisher.

While the invention has been described in terms of particular embodiments and illustrative figures, those of ordinary skill in the art will recognize that the invention is not limited to the embodiments or figures described. For example, the computing device utilized by the user in embodiments described above is a personal computer. In other embodiments, the computing device may be any type of computing devices, such as a mobile telephone, a personal digital assistant (PDA), or the like.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

We claim:

1. A network device for monitoring data traffic between a client device and a server device, the network device comprising:
    a network interface having a bypass switch, the interface being coupled to a network and configured to intercept or bypass data packets transmitted between a user device and a web server;
    an activity monitor configured to monitor a predetermined signal and causing the network interface to bypass data packets;
    a dispatcher implemented in a processing unit, coupled to the network interface, examining the intercepted data packets to identify any advertising opportunity in the intercepted data packets; and
    an analysis processor having a storage device for storing targeted commercial information and a processing unit configured to modify the intercepted data packets being identified by the dispatcher as having an advertisement opportunity to include the targeted commercial information in one or more of the intercepted data packets without altering head portions thereof.

2. The network device as recited in claim 1, wherein the analysis processor includes a module configured to place the commercial information near a primary place in a webpage.

3. The network device as cited in claim 2, wherein the primary place is a place wherein there is an advertisement originally in the webpage.

4. The network device as recited in claim 1, wherein the network device is deployed in an inline fashion and placed at a location in a network where there is a high probability that the data packets carrying content both generated by and consumed by users can be conveniently examined.

5. The network device as recited in claim 4, wherein operations of the network device are completely transparent to the client device or the server device as source and destination addresses in the head portions of the data packets are kept intact even the data packets are modified to include the commercial information.

6. The network device as recited in claim 1, wherein the analysis processor is configured to access a database for a profile of a user of the client device to maximize relevancy of the commercial information to the user.

7. The network device as recited in claim 6, where the dispatcher and the analysis processor are together able to dynamically correlate behaviors of a user in a different applications communicated via a variety of applications specific protocols.

8. The network device as recited in claim 7, wherein the dispatcher is configured to detect a mention of the commercial information in an application that has not been provided any of the commercial information.

9. The network device recited in claim 1, wherein the commercial information is customized based on content or context of the content from the client device.

10. The network device as recited in claim 1, wherein the commercial information is customized based on specific information about a user of the client machine so as to maximize relevancy of the commercial information to the user and improve a likelihood of successful conversion.

11. A method for monitoring and modifying data traffic between a client device and a server device by a computer-equipped network device situation between the client device and the server device, the method comprising computer-implemented steps of:
    monitoring a predetermined signal for determining whether to bypass or to intercept a flow of data packets at a network interface, each data packet having a destination address;
    bypassing a data packet upon an indication by the predetermined signal;
    intercepting only data packets determined ought to be intercepted;
    detecting whether the intercepted data packets satisfy predetermined selection criteria;
    modifying payloads of the intercepted data packets to include targeted commercial information stored in a storage device without altering head portions of the intercepted data packets; and forwarding the flow of the modified data packets to the destination address.

12. The method as recited in claim 11, further comprising analyzing the detected packets to identify content, context or behaviors of a user of the client device.

13. The method as recited in claim 12, further comprising inserting the targeted commercial information into the data packets, the targeted commercial information corresponding substantially to the content, context or behaviors of the user.

14. The method as recited in claim 13, further comprising detecting user interaction with the targeted commercial information.

15. The method as recited in claim 13, further comprising detecting a user click-through event corresponding to the targeted commercial information.

16. The method as recited in claim 12, wherein said detecting whether the data packets satisfying predetermined selection criteria comprises detecting the data packets based on information contained in Open Systems Interconnection (OSI) layer 2, OSI layer 3, or OSI layer 4; and said analyzing the detected packets comprises analyzing the data packets based on information contained in OSI layer 6 OSI layer 7.

17. The method as recited in claim 11, further comprising updating a profile of a user of the client device corresponding to the content, context or behaviors of the user.

18. The method as recited in claim 17, wherein the profile does not include any personally identifiable information (PII) of the user.

19. The method as recited in claim 11, wherein said intercepting a flow of data packets comprises forwarding the data packets to the destination without having any of the data packets modified, wherein there is a need.

20. The method as recited in claim 11, wherein said detecting whether the data packets satisfying predetermined selection criteria comprises:
- determining whether the payloads of the data packets allow an addition or insertion of the targeted commercial information;
- forwarding the data packets to the destination without having any of the data packets modified, if said determining is false;
- routing the data packets to a module configured to modify payloads of the data packets to include targeted commercial information, if said determining is true.

* * * * *